US011200180B2

(12) United States Patent
Benisty

(10) Patent No.: US 11,200,180 B2
(45) Date of Patent: Dec. 14, 2021

(54) NVME SGL BIT BUCKET TRANSFERS

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 19 days.

(21) Appl. No.: 16/778,177

(22) Filed: Jan. 31, 2020

(65) Prior Publication Data

US 2021/0240641 A1 Aug. 5, 2021

(51) Int. Cl.
*G06F 13/16* (2006.01)
*G06F 3/06* (2006.01)
*G06F 13/42* (2006.01)

(52) U.S. Cl.
CPC ........ *G06F 13/1668* (2013.01); *G06F 3/0626* (2013.01); *G06F 3/0647* (2013.01); *G06F 3/0656* (2013.01); *G06F 3/0659* (2013.01); *G06F 3/0679* (2013.01); *G06F 13/4282* (2013.01); *G06F 2213/0026* (2013.01)

(58) Field of Classification Search
CPC .... G06F 3/0601; G06F 3/0602; G06F 3/0626; G06F 3/0646; G06F 3/0647; G06F 3/0655; G06F 3/0656; G06F 3/0658; G06F 3/0659; G06F 3/0661; G06F 3/0679; G06F 13/1668; G06F 13/4282; G06F 3/06; G06F 13/20; G06F 13/42; G06F 13/16
See application file for complete search history.

(56) References Cited

U.S. PATENT DOCUMENTS

| 8,495,301 | B1* | 7/2013 | Alexander | ............. G06F 13/28 711/118 |
| 9,110,786 | B2 | 8/2015 | Carlson et al. | |
| 9,990,138 | B2 | 6/2018 | Halaharivi | |
| 10,339,079 | B2 | 7/2019 | Dewitt et al. | |
| 10,956,245 | B1* | 3/2021 | Izhar | ....................... G06F 3/064 |
| 2015/0127882 | A1* | 5/2015 | Carlson | ............... G06F 12/0246 711/103 |
| 2017/0116117 | A1* | 4/2017 | Rozen | ................. G06F 12/0246 |
| 2017/0285940 | A1 | 10/2017 | Benisty et al. | |
| 2018/0253386 | A1 | 9/2018 | Qiu et al. | |
| 2021/0004165 | A1* | 1/2021 | Benisty | ................. G06F 3/0673 |

FOREIGN PATENT DOCUMENTS

| KR | 20170121661 A | 11/2017 |
| KR | 20190131012 A | 11/2019 |

OTHER PUBLICATIONS

"NVM Express". Revision 1.3. May 1, 2017. NVM Express, Inc. (Year: 2017).*
Marks, Kevin. "An NVM Express Tutorial". 2013. Flash Memory Summit 2013. Santa Clara, CA. (Year: 2013).*

* cited by examiner

*Primary Examiner* — Thomas J. Cleary
(74) *Attorney, Agent, or Firm* — Patterson & Sheridan, LLP; Steven H. Versteeg

(57) ABSTRACT

Embodiments generally relate to handling of NVMe scatter gather list bit bucket transfers by a data storage device. The data storage device transfers the data associated with the bit bucket transfers to a host or to a controller memory buffer of the data storage device. The data storage device can transfer the data associated with the bit bucket transfers to the host by modifying transaction layer packets (TLPs) to indicate to the host to ignore the data payload of the TLPs.

19 Claims, 9 Drawing Sheets

NVME SGL BIT BUCKET TRANSFERS

BACKGROUND OF THE DISCLOSURE

Field of the Disclosure

Embodiments generally relate to handling of NVMe scatter gather list (SGL) bit bucket transfers by a data storage device.

Description of the Related Art

NVM Express (NVMe) is an interface protocol between a host and a data storage device, such as a solid state drive (SSD), for accessing data stored in the data storage device. The NVMe protocol is based on a paired submission queue and completion queue mechanism. Commands, such as read commands and write commands, are placed by host software into a submission queue and are fetched by the data storage device for execution. Completions are placed into the associated completion queue by storage device controller to notify the host of completion of the commands. NVMe data structures, such as submission queues, completion queues, Physical Region Page (PRP) entries, scatter gather lists (SGLs), and data buffers are stored in host memory of a host or a controller memory buffer of a data storage device. Implementation of NVMe data structures, such as SGLs containing a SGL bit bucket descriptor, increases the complexity of data storage devices. Therefore, an improved NVMe data storage device is needed.

SUMMARY OF THE DISCLOSURE

Embodiments generally relate to handling of NVMe SGL bit bucket transfers by a data storage device.

In one embodiment, a process of a device-to-host transfer of data using a SGL with one or more bit bucket transfers includes receiving a transfer command of the data. A SGL descriptor associated with the data is fetched. Whether the SGL descriptor is a SGL bit bucket descriptor or a SGL data block descriptor is determined. A modified transaction layer packet (TLP) is generated when the SGL descriptor is determined to be a SGL bit bucket descriptor. The modified TLP includes an indication to the host to ignore a data payload of the modified TLP. The modified TLP is transferred to the host.

In one embodiment, a data storage device includes a host interface operable to interface with a host, a non-volatile memory, and a storage device controller. The storage device controller is operable to receive a transfer command of a data written to non-volatile memory. The transfer command uses a SGL and including one or more bit bucket transfers. The storage device controller is operable to fetch an SGL descriptor associated with the data. The storage device controller is operable to determine whether the SGL descriptor is a SGL bit bucket descriptor or a SGL data block descriptor. The storage device controller is operable to generate a modified TLP when the SGL descriptor is determined to be a SGL bit bucket descriptor. The modified TLP include an indication to the host to ignore a data payload of the modified TLP. The storage device controller is operable to transfer the modified TLP to the host.

In another embodiment, a data storage device include a host Peripheral Component Interface Express (PCIe) interface operable to interface with a device PCIe interface of a host. The data storage device further includes a non-volatile memory and a NVM Express (NVMe) storage device controller. The NVME storage device controller transfers a data from the device to the host involving one or more bit bucket transfers. The one or more bit bucket transfers are to a destination of a host memory buffer of the host, a controller memory buffer of the NVMe storage device controller, or the device PCIe interface of the host.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments generally relate to handling of NVMe scatter gather list bit bucket transfers by a data storage device. The data storage device transfers the data associated with the bit bucket transfers to a host or to a controller memory buffer of the data storage device. The data storage device can transfer the data associated with the bit bucket transfers to the host by modifying TLPs to indicate to the host to ignore the data payload of the TLPs.

In certain embodiments, the present storage device controller supports SGL bit bucket transfers without breaking the internal data pipe of the storage device controller. Breaking the internal data pipe of the storage device controller complicates the implementation of supporting SGL bit bucket transfers and requires extra logic (e.g. hardware and/or firmware) and computations.

Figure 1:
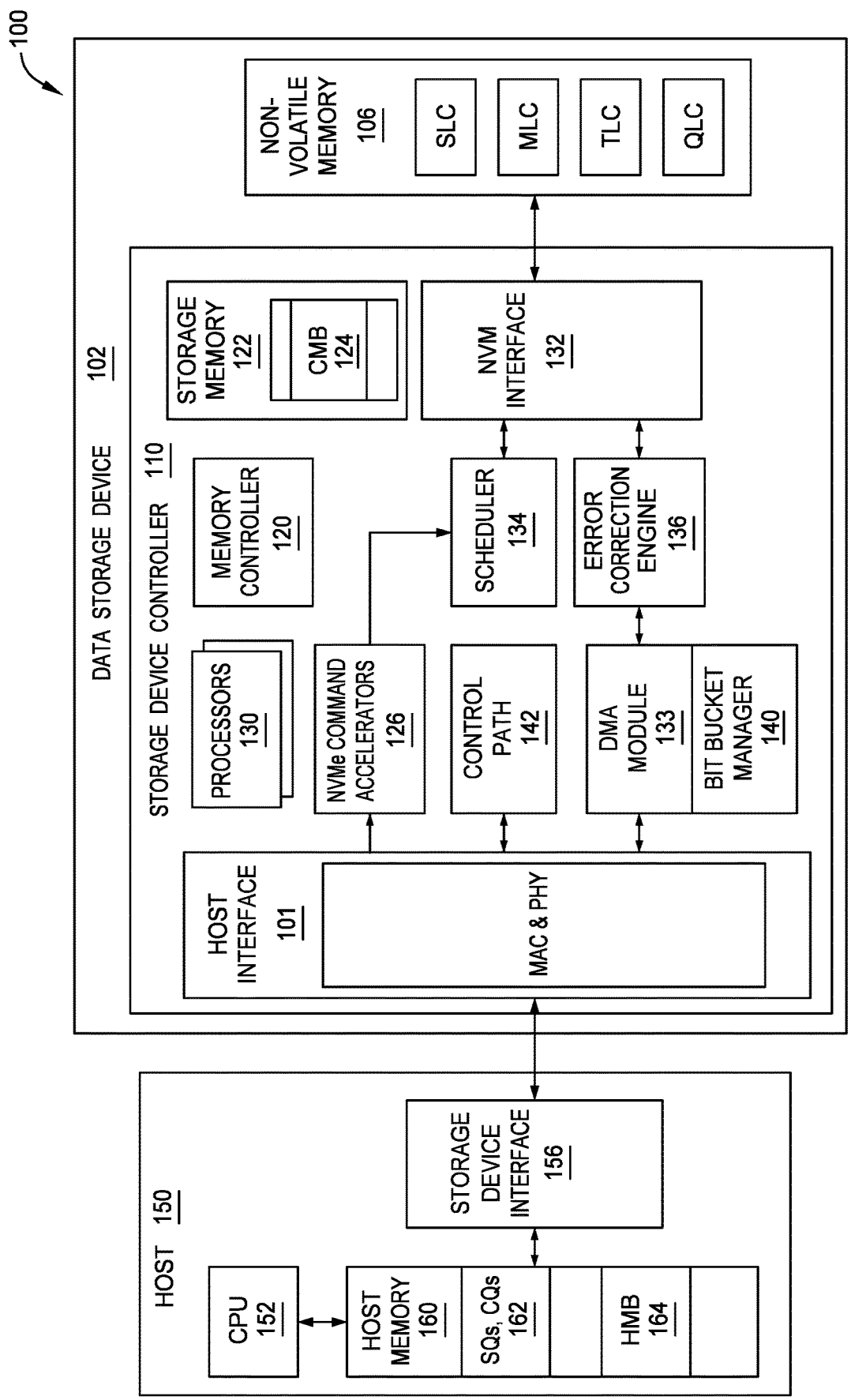
FIG. 1 is a schematic block diagram illustrating certain embodiments of a computer system including a host connected to a data storage device.

FIG. 1 is a schematic block diagram illustrating certain embodiments of a computer system 100 including a host 150 connected to a data storage device 102, such as a solid state drive (SSD). Host 150 utilizes a non-volatile memory (NVM) 106, such as NAND flash memory, included in data storage device 102 to write and to read data, such as for long term memory storage.

Host 150 can be a hardware platform including one or more central processing units (CPUs) 152, host memory space 160, and a storage device interface 156. Host 150 may include a wide range of devices, such as computer servers, network attached storage (NAS) units, desktop computers, notebook (e.g., laptops) computers, tablet computers (e.g., "smart" pads), mobile devices, set-top boxes, telephone handsets (e.g., "smart" phones), televisions, cameras, display devices, digital media players, video gaming consoles, video streaming devices, and automotive applications (e.g., mapping, autonomous driving). In certain embodiments, host 150 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host memory space 160 is a device allowing information, such as executable instructions, cryptographic keys, configurations, and other data, to be stored and retrieved. Host memory space 160 can be DRAM, SRAM, other main memories, and combinations thereof. An application program may be stored to host memory space 160 for execution by components of host 150. Host memory space 160 may include host queues 162, such as command submission queues (SQs) and command completion queues (CQs). Host memory space 160 may include a host memory buffer (HMB) 164 for use by the data storage device 102.

In certain embodiments, the storage device interface 156 can be a network interface. Network interface enables host 104 to communicate with data storage device 102 via a communication medium, such as a network coupling host 150 and data storage device 102 within the computing system 100. Network interface may be one or more network adapters, also referred to as Network Interface Cards (NICs). In certain embodiments, the storage device interface 156 can be a dedicated link between host 104 and data storage device 102.

The storage device interface 156 of host 150 interacts with a host interface 101 of the data storage device 102 for ingress and egress of communications between host 150 and data storage device 102. Storage device interface 156 and host interface 101 operate under a communication protocol, such as a Peripheral Component Interface Express (PCIe) serial communication protocol or other suitable communication protocols. In the PCIe communication protocol, host 150 and storage device 102 send requests to each other as TLPs. The storage device interface 156 includes one or more ports, such as a PCIe port, an RDMA port (Ethernet, RoCE/iWARP, InfiniBand), a fibre channel port, a TCP port, or other suitable fabric ports. Devices connected to the PCIe fabric direct communications to other devices by providing a PCIe address. The fabric routes such communications to the appropriate device based on the PCIe address. One portion of the address is a device number that specifies the physical device to which a communication is to be routed.

Host 150 and data storage device 102 can communicate over the PCIe interface through NVMe communications. NVMe communications can be by one or more of NVMe over PCIe fabrics, NVMe over non-PCIe fabrics, and/or local PCIe. NVMe over non-PCIe fabrics includes a transport abstraction layers at both sides of the fabric interfaces to translate native PCIe transactions over non-PCIe fabrics. Host 150 can be connected to the storage device 102 over a data center storage system network, an enterprise storage system network, a storage area network, a cloud storage network, a local area network (LAN), a wide area network (WAN), the Internet, other networks, wired links, wireless links, and interconnections thereof.

Data storage device 102 may be a network storage device, an internal storage drive (e.g., server computer, desktop hard drive, notebook computer), a data center storage device, an external storage device, an embedded mass storage device, a removable mass storage device, and other suitable data storage devices.

Data storage device 102 includes a storage device controller 110 which manages operations of storage device 102, such as writes to and reads from NVM 106. Storage device controller 110 may include one or more processors 130, which may be multi-core processors. Processor 130 handles the components of data storage device 102 through firmware and/or software. Processor 130 executes instructions of the computer-readable program code of the firmware and/or software. Storage controller 110 implements the processes described herein by execution of instructions by the processor 130, by hardware, or by combinations thereof. Hardware can include various components of storage device controller 110, such as logic gates, switches, application specific integrated circuits (ASICs), programmable logic controllers, embedded microcontrollers, registers, and other components.

Storage device controller 110 may operate under the NVMe protocol, but other protocols are applicable. The NVMe protocol is a communications interface/protocol developed for SSDs to operate over a host and storage device linked over a PCIe interface. NVMe protocol provides a command queue and completion path for access of data stored in data storage device 102 by host 150.

Storage device controller 110 also includes a memory controller 120. Memory controller 120 controls access to a storage memory 122 of the storage device controller 110. Storage memory 122 of storage device controller 110 can include dynamic random access memory (DRAM), static random access memory (SRAM), and registers. DRAM and SRAM are volatile memories or cache buffer(s) for short-term storage or temporary memory during operation of data storage device 102. Volatile memories do not retain stored data if powered off. DRAM requires periodic refreshing of stored data while SRAM does not require refreshing. SRAM provides faster access to data but is more expensive than DRAM. Registers includes flip-flops, latches, counters, and other registers. Storage memory 122 can further include a controller memory buffer (CMB) 124 for use by host 150. CMB 124 is typically allocated in DRAM of storage memory 122. As used herein, the term CMB can also include persistent memory regions (PMRs).

NVM 106 of storage device 102 may be configured for long-term storage of information as non-volatile memory space and retains information after power on/off cycles. NVM 106 may comprise one of more dies of NAND flash and/or NOR flash memory arrays. The flash memory arrays may be operated as single-level cells (SLC), multiple-level cells (MLC), triple-level cells (TLC), quad-level cells (QLC), or other memory cell level technologies, now known or later developed. The NAND flash memory arrays can be fabricated in a two-dimensional or three-dimensional architecture. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. NVM 106 may include one or more types of non-volatile memory.

Storage device controller 110 may also include other components, such as a NVM interface module 132, a direct memory access (DMA) module 133, a scheduler 134, an error correction engine 136, a control path 142, and NVMe command accelerators 126. Flash interface module 132 interacts with NVM 106 for read and write operations. DMA module 133 executes data transfers between host 150 and storage device 102 without involvement from CPU 152. Scheduler 134 controls the data transfer while activating the control path for fetching Scatter Gather Lists (SGLs), posting completion and interrupts, and activating the DMAs for the actual data transfer between host 150 and data storage device 102. Error correction engine 136 corrects the data fetched from the memory arrays. NVMe command accelerator 126 automatically executes and accelerates NVMe commands towards scheduler 134. NVMe command accelerator typically comprises hardware to reduce firmware and/or software interactions to host interface 101.

Storage device controller 110 further includes a bit bucket manager 140. Bit bucket manager 140 can be implemented as part of DMA module 133 or as a separate module. Bit bucket manager 140 detects whether a device-to-host transfer is associated with a SGL bit bucket descriptor. When the bit bucket manager 140 detects a SGL bit bucket descriptor, the storage device controller 110 modifies an attribute of the transfer in various embodiments.

NVMe is based on a paired submission and completion queue mechanism. Commands are placed by host software into a submission queue (SQ). Completions are placed into the associated completion queue (CQ) by the storage device controller 110. Submission and completion queues 162 can be allocated in host memory 160 or in CMB 124 of storage memory 122.

The physical memory locations (e.g. locations in host DRAM) in host memory 160 of host 150 which are used for data transfers are specified using either Physical Region Page (PRP) entries or a Scatter Gather List (SGL). The physical memory locations in host memory 160 can either be a source buffer (e.g., a read from memory to controller) or a destination buffer (e.g., a write from the controller to memory). The PRP entries or SGL instructs the DMA module 133 where to read data from physical memory locations in host memory 160 or to write data to physical memory locations in host memory 160 without involvement from CPU 152.

Figure 2A:
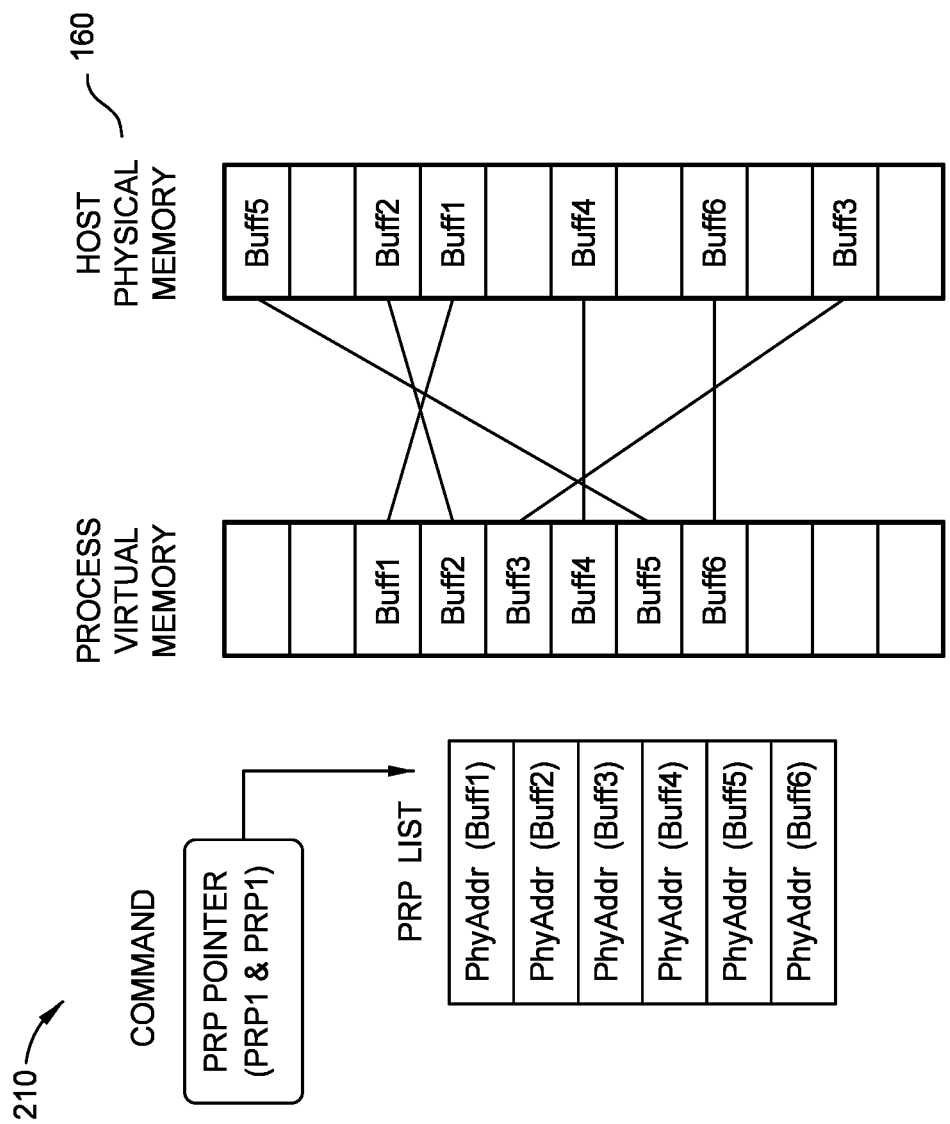
FIG. 2A is a schematic diagram illustrating Physical Page Region (PRP) entries and host data buffers of host memory.

FIG. 2A is a schematic diagram illustrating Physical Page Region (PRP) entries 210 and host data buffers of host memory 160. The PRP list maps the physical addresses of host physical memory and the logical addresses of host virtual memory of host data buffers of the same fixed size for data transfers by storage device controller 110. PRP entries (PRP1 & PRP2) points to the physical location of the host data buffer or to a PRP list of PRP entries. Each PRP entry of the PRP list describes each host data buffer as the same fixed size (i.e., 4K bytes).

Figure 2B:
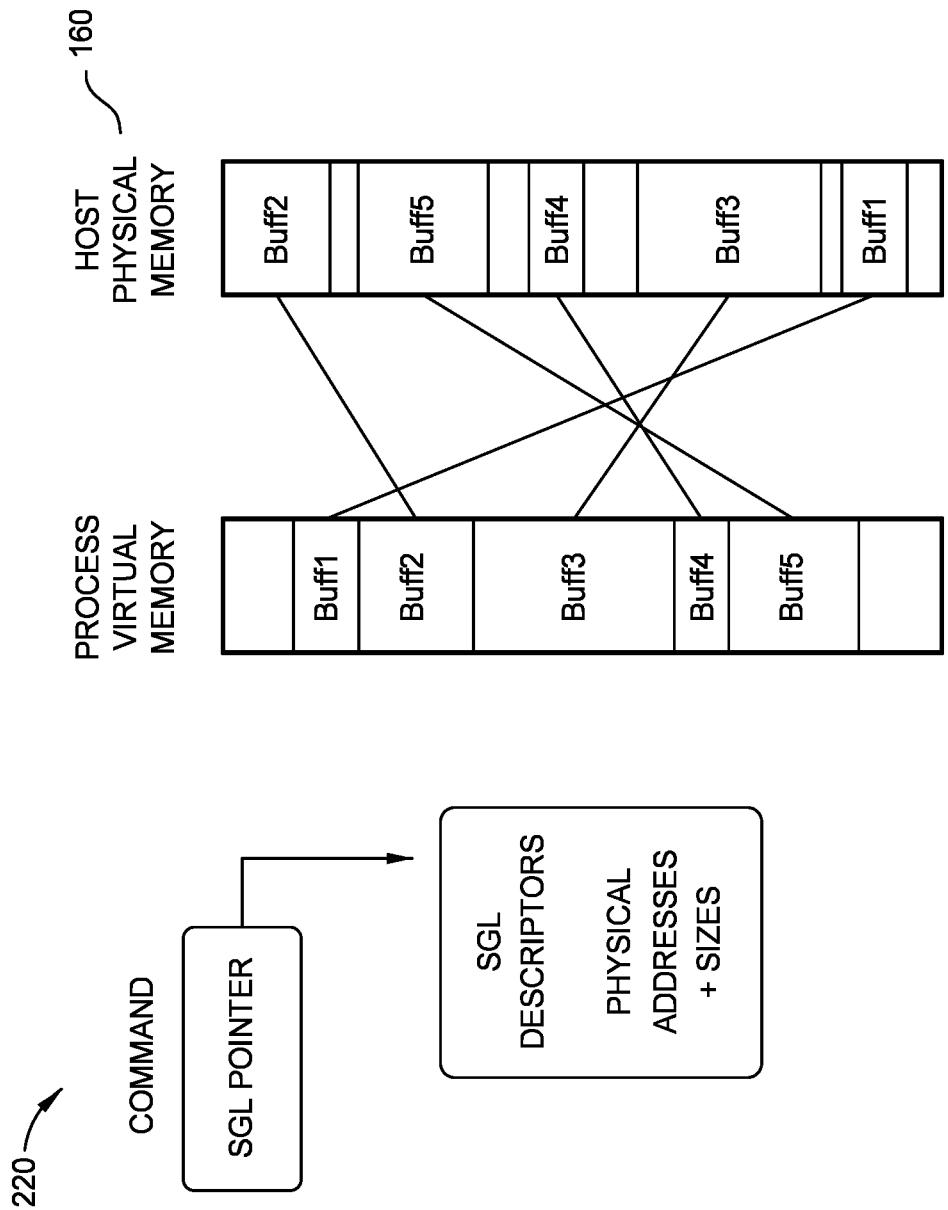
FIG. 2B is a schematic diagram illustrating a Scatter Gather List (SGL) and host data buffers of host memory.

FIG. 2B is a schematic diagram illustrating a SGL 220 and host data buffers of host memory 160. The SGL maps the physical addresses of host physical memory and the logical addresses of host virtual memory of host data buffers of the any size for data transfers by storage device controller 110. Each host data buffer may be described by a dedicated SGL data block descriptor in which the address and the size of the data buffer are described.

Figure 3:
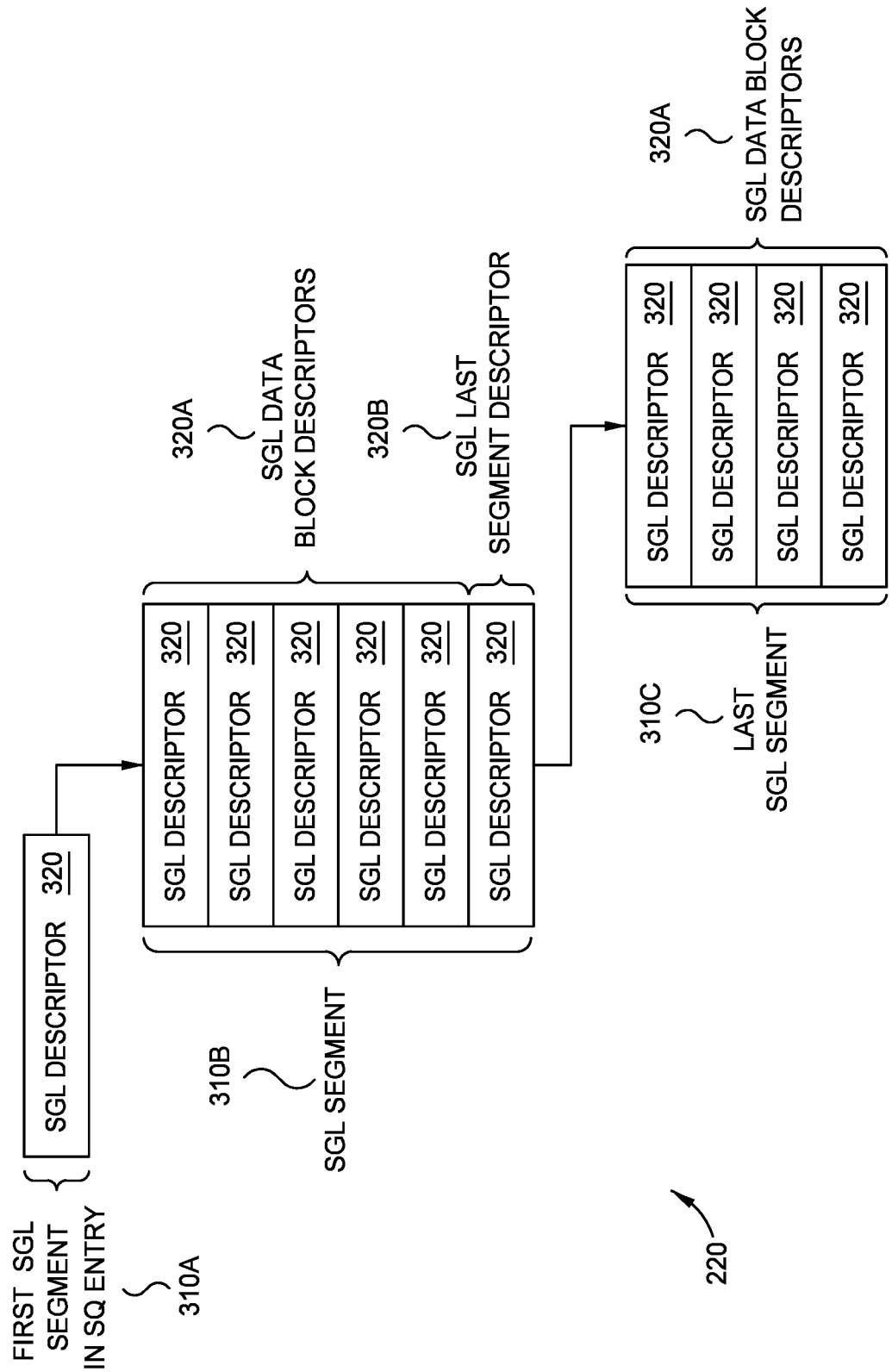
FIG. 3 is a schematic diagram illustrating a SGL.

FIG. 3 is a schematic diagram illustrating a SGL 220, such as the SGL 220 contained in an NVMe command of FIG. 2B or other appropriate SGLs. Each SGL 220 comprises one or more SGL segments 310A-B. Each SGL segment 310 comprises one or more SGL descriptors 320 stored contiguously in memory. If more than one SGL segment 310 is needed to describe a data buffer, then a SGL segment can contain a pointer to the next SGL segment store non-contiguously in memory from the prior SGL segment. Each SGL descriptor 320 is one of the following types as specified in TABLE 1.

TABLE 1

| CODE | SGL DESCRIPTOR TYPE |
| --- | --- |
| 0h | SGL Data Block Descriptor |
| 1h | SGL Bit Bucket Descriptor |
| 2h | SGL Segment Descriptor |
| 3h | SGL Last Segment Descriptor |
| 4h-Eh | Reserved |
| Fh | Vendor Specific Descriptor |

A SGL data block descriptor 320A describes the starting address and size in byte granularity of a single host data buffer. A SGL bit bucket descriptor instructs storage device controller 110 that in a host read of NVM 106 that a certain amount of read data shall be discarded. A SGL segment descriptor is a pointer to the next SGL segment. A SGL last segment descriptor 320B is a pointer to the next and last SGL segment 310C.

The SGL bit bucket descriptor can be used by host 150 to check that data stored in NVM 106 is readable (e.g., with low or no errors). The SGL bit bucket descriptor can be used by host 150 to transferring read data from NVM 106 to the host and discarding the metadata associated the read data.

Figure 4:
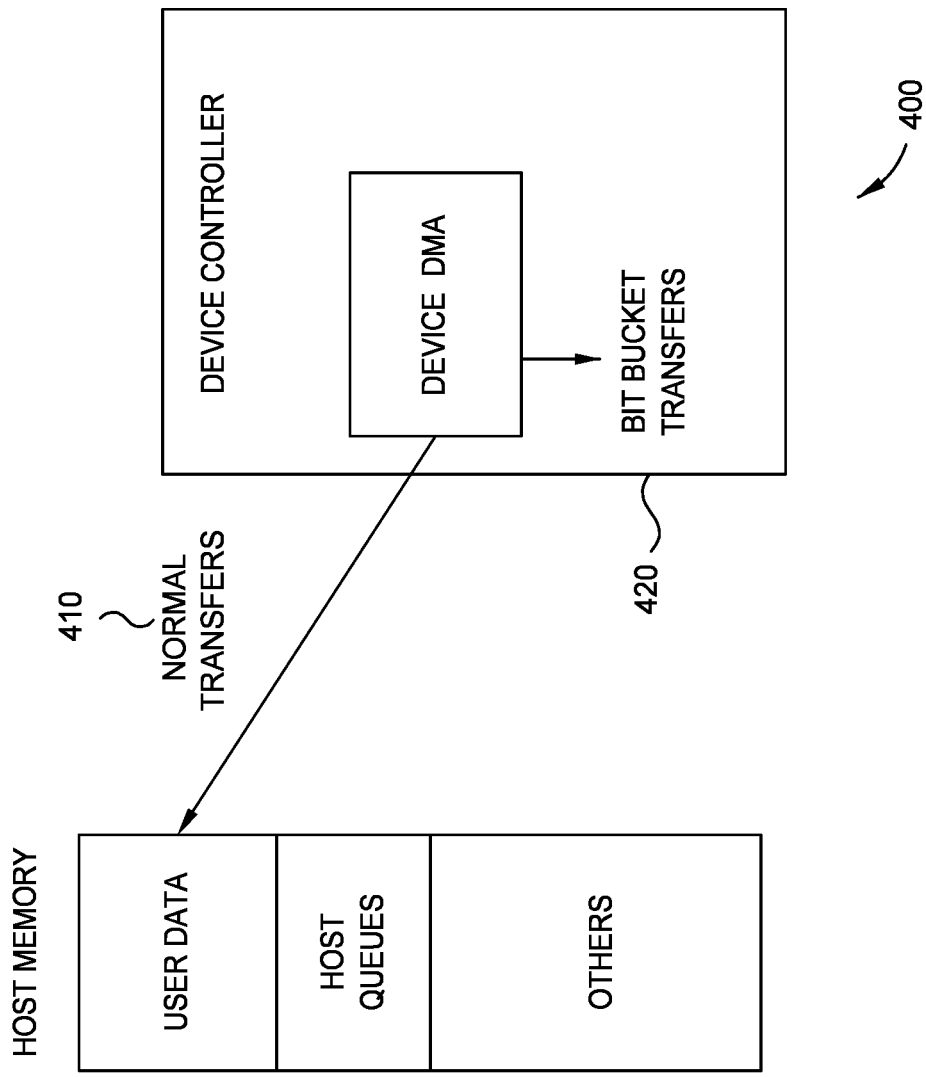
FIG. 4 is a schematic diagram of a prior art process 400 of implementing a device-to-host transfer of data including one or more bit bucket transfers.

FIG. 4 is a schematic diagram of a prior art process 400 of implementing a device-to-host transfer of data including one or more bit bucket transfers. The device DMA module of a prior art storage device detects whether a data transfer is associated with a SGL bit bucket descriptor. If the data transfer is not associated with a SGL bit bucket descriptor, the device DMA module transfers the data to a destination host data buffer in host memory in a normal transfer 410, such as with a memory write request TLP. If the data transfer is associated with a SGL bit bucket descriptor, the device DMA module does not send transfer the data to a destination host data buffer in host memory. The device DMA module drops the transaction in a bit bucket transfer 420 by discarding the data.

One drawback of process 400 is the complexity of the implementation of normal transfers 410 versus bit bucket transfers 420. For example, an NVMe command may contain both normal transfers 410 and bit bucket transfers 420. For the data storage device to write a command completion to a CQ for this command, the data storage device requires extra logic to confirm that in one aspect a data transfer was made to a host data buffer in a normal transfer and in a contrary aspect data was discarded in a bit-bucket transfer. Although both a normal transfer and a bit bucket transfer activate the data pipe (e.g., activate the NVM interface) to read data from NVM, the data pipe becomes divergent since the data packets in a normal transfer are sent to the host while the data packets in a bit bucket transfer are discarded.

Figure 5:
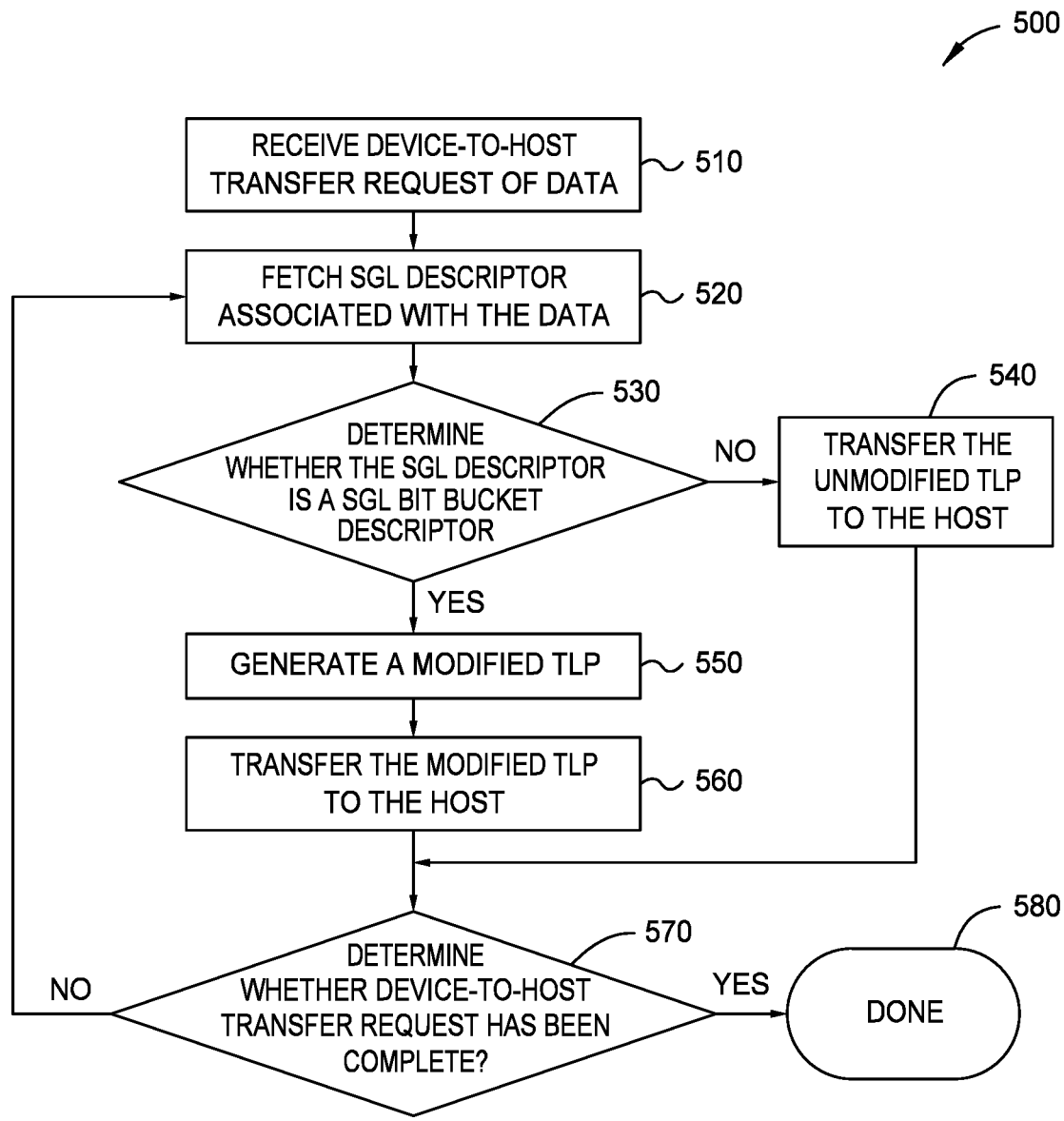
FIG. 5 is a schematic flowchart illustrating a process of a device-to-host transfer of data using one or more SGL bit bucket descriptors by transferring one or more TLPs to the host.

FIG. 5 is a schematic flowchart illustrating a process 500 of a device-to-host transfer of data using one or more SGL bit bucket descriptors by transferring one or more TLPs to the host 150. The SGL of the device-to-host transfer of data can include one or more SGL bit bucket descriptors with or without any SGL data block descriptors. The process 500 is described in reference to the storage device controller 110 of the data storage device 102 of the computer system 100 of FIG. 1, but other storage device controllers are applicable.

At block 510 of process 500, the storage device controller 110 receives a device-to-host transfer request of data. For example, the device-to-host transfer request of data can be a NVMe read command of NVM 106 specifying a SGL for the data transfer in which the SGL has one or more SGL bit bucket descriptors. The NVMe read command can be fetched form a SQ stored in host memory 160 or from a SQ stored in CMB 124 of storage device controller 110.

At block 520, the storage device controller 110 processes the device-to-host transfer request by fetching a SGL descriptor associated with the requested data. For example, the storage device controller 110 activates the control path 142 to fetch the SGL descriptor associated with the requested data. The SGL can be fetched from host memory 160 or from a CMB 124 of the storage device controller 110. A SGL descriptor associated with the requested data can either be a SGL data block descriptor or a SGL bit bucket descriptor from an appropriate SGL segments (e.g. SGL Segment 0, SGL Segment 1, SGL Segment 2 . . . last memory location of the SGL). For example, a SGL can comprise a first SGL entry pointing to the next SGL segment, which in turn can point to the next SGL segment, etc., until the last memory location of the SGL. In certain embodiments, a SGL descriptor is fetched one at a time by the storage device controller 110. In certain embodiments, contiguous SGL descriptors are fetched together by the storage device controller 110.

At block 530, the storage device controller 110 determines whether the SGL descriptor fetched at block 520 is a SGL bit bucket descriptor or a SGL data block descriptor. For example, the bit bucket manager 140 determines whether the SGL descriptor is or is not a SGL bit bucket descriptor.

Process 500 proceeds to block 540 from block 530 if the SGL descriptor is a SGL data block descriptor (e.g., is not a SGL bit bucket descriptor). At block 540, the storage device controller transfers to the host 150 one or more unmodified TLPs of the requested data associated with the SGL data block descriptor from block 530. The TLPs associated with a SGL data block descriptor are unmodified. The term "unmodified" as used herein means that the TLP does not contain any indication to the host 150 for the host to ignore the data payload of the TLP. For example, the storage device controller 110 sends an unmodified memory write request TLP to host 150 via host interface 101. The unmodified memory write request TLP causes host 150 to write the requested data from data storage device 102 to a physical location in host memory 160 as indicated by the SGL data block descriptor.

Process 500 proceeds to block 550 from block 530 if the SGL descriptor is a SGL bit bucket descriptor. At block 550, the storage device controller 110 generates one or more modified TLPs of the requested data associated with the SGL bit bucket descriptor from block 530. The TLPs associated with a SGL bit bucket descriptor are modified. The term "modified" as used herein means that the TLP contains one or more indications to the host 150 for the host to ignore the data payload of the TLP. For example, the storage device controller 110 sends a modified memory write request TLP to host 150, but the modified memory write request TLP does not cause the host 150 to write the requested data to a user data location in host memory 160.

At block 560, the storage device controller 110 transfers the one or more modified TLPs generated from block 550 to the host 150 via host interface 101 to storage device interface 156 of host 150. From the indications of the one or more modified TLPs, the host 150 ignores the data payload of the one or more modified TLPs.

At block 570, the storage device controller 110 determines whether the transfer request received at block 510 has been completed. If the transfer request has not been completed, the process 500 proceeds back to block 520 to fetch the next SGL descriptor associated with the requested data. If the transfer request has been completed, the process 500 of transferring data in a device-to-host transfer request is done.

In process 500, for both SGL bit bucket descriptors and SGL data block descriptors, storage device controller 110 transfers TLPs with data payloads to the host 150. Therefore, the internal data pipe of the data storage device 102 to the host 150 is congruent for SGL bit bucket descriptors and SGL data block descriptors since the requested data is not discarded but is delivered to the host 150. In contrast, prior art process 400 transfers TLPs to the host in normal transfers 410 but does not transfer any TLPs to the host in bit bucket transfers. Instead of dropping the transactions associated with SGL bit bucket descriptors, storage device controller 110 in process 500 does transfer data payloads to the host 150 but indicates to the host 150 to ignore the data payloads as to not corrupt host memory 160.

Figure 6:
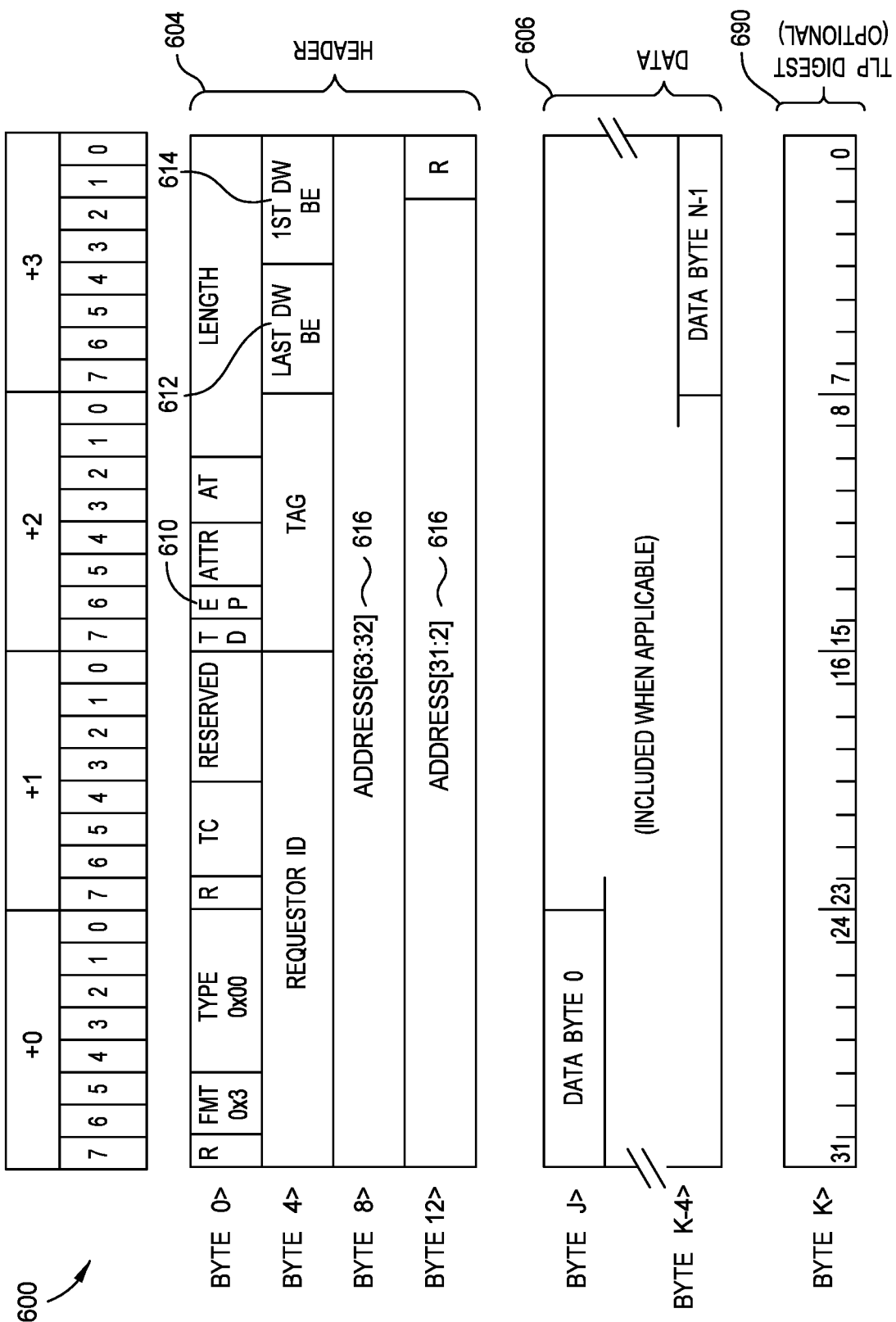
FIG. 6 is a schematic diagram of a request TLP between a data storage device and a host in a computer system.

FIG. 6 is a schematic diagram of a request TLP 600 between a data storage device and a host in a computer system. For ease of description, the request TLP 600 will be described in reference to the data storage device 102 and the host 150 of the computer system 100 of FIG. 1 but other computer systems are applicable. In certain embodiments, the request TLP 600 is a memory write TLP in response to a read command from host 150 to write the requested read data from the data storage device 102 in a physical location in a host memory space 160.

Request TLP 600 includes a header 604 and a data payload 606. The associated data of the request is transferred as a data payload 606 of one or more request TLPs 600.

Header 604 includes transaction control information for management of the request TLP 600 between the data storage device 102 and the host 150. Header 604 can include some or all of the following fields: a format (FMT) field, a type field, a traffic class (TC) field, a TD field, an error forwarding (EP) field 610, an attributes (Attr) field, a length field, a requester ID field, a tag field, a last DW Byte Enables (BE) field 612, a $1^{st}$ DW BE field 614, and an address field 616.

Format field indicates a format of request TLP 600. For example, a format field value of 010b (0x2) indicates a three-DW header including a 32-bit address for the address field 616 with a data payload. A format field value of 011 b (0x3) indicates a four-DW header including a 64-bit address for the address field 616 with a data payload. Request TLP 600 as shown in FIG. 6 utilizes an address field 605 comprising a 64-bit address, although a 32-bit address can also be used.

Type field indicates a type of transaction. For example, a type field value of 0000b (0x00) indicates a memory read request. The TC field indicates a differentiate traffic service class, such as best effector service class, weighted-round-robin service classes, priority service classes. The requester ID field is a number that uniquely identifies the requester (such as data storage device 102) that introduces the transaction request TLP. The last byte enable field and the first byte enable indicates the location of the byte enables.

Request TLP 600 may include an optional TLP prefix (not shown). The setting of the TD field indicates the presence of an optional TLP digest 690. For example, request TLP 600 may include an optional end-to-end cyclic redundancy checksum (ECRC) in the TLP digest 690.

As request TLPs 600 are transferred between data storage device 102 and host 150, a data link layer and physical layer are added to each request TLP 600 so that request TLP 600 arrives at the intended destination. A data link layer adds the sequence number and link layer CRC (LCRC) to the request TLP 600 for transmission across the link. A physical layer adds information to mark the beginning and end of the request TLP 600.

For example, in response to a read command from host 150 to data storage device 102, one or more request TLPs 600 contain the read data as a data payload 606 of the one or more request TLPs 600. Each PCIe device is set to a certain maximum TLP payload size (MPS) for a data payload 606, such as 128 bytes, 256 bytes, 512 bytes, 1 kilobytes, 2 kilobytes, 4 kilobytes, etc. During enumeration and configuration of connected devices, such as data storage device 102 within system 100, the connected devices advertise their maximum TLP payload size supported. System 100 default setting is to use the highest common maximum TLP payload size supported along a path of the request TLP 600.

The modified TLPs generated at block 550 of process 500, or other suitable processes, in response to a SGL bit bucket descriptor contains one or more indications to the host 150 for the host to ignore the data payload 606 of the request TLP 600.

One embodiment of a modified TLP with an indication to ignore the data payload is a TLP 600 (or other suitable TLP) indicating that the byte-enable of the transfer is zero (i.e., a zero length write). A request TLP 600 may indicate that the byte-enable of the transfer is zero by clearing entries for the Last BE field 612 and the $1^{st}$ BE field 614. For example, for a SGL bit bucket descriptor involving a short-length data read, the storage device controller 110 may modify the request TLP 600 by clearing the entries for the Last BE field and the $1^{st}$ BE field. In other word, the memory write request TLP indicate byte enables but lacks any selection of the affected bytes. The host 150 ignores this memory write request TLP since the data payload is invalid and to avoid corruption of host memory.

Another embodiment of a modified TLP with an indication to ignore the data payload is a TLP 600 (or other suitable TLP) indicating that the TLP is poisoned. The request TLP 600 is poisoned by setting the EP bit to 1. The Host 150 ignores the write request TLP that is poisoned. Poisoned TLPs are used for error forwarding of errors for controlled propagation of errors through the computer system without causing corruption of host memory 160. Host 150 will handle the modified write request TLP that is poisoned by ignoring the TLP as a forwarded error.

Still another embodiment of a modified TLP with an indication to ignore the data is a TLP 600 (or other suitable TLP) with a replaced address in the address field 616. For example, the replaced address can be an address in the HMB 164 of host memory 160 allocated to data storage device 102. Since the HMB 164 is allocated to data storage device 102, host memory 160 isn't corrupted by placement of the data payload 606 of the TLP 600 in a location in HMB 164.

Figure 7:
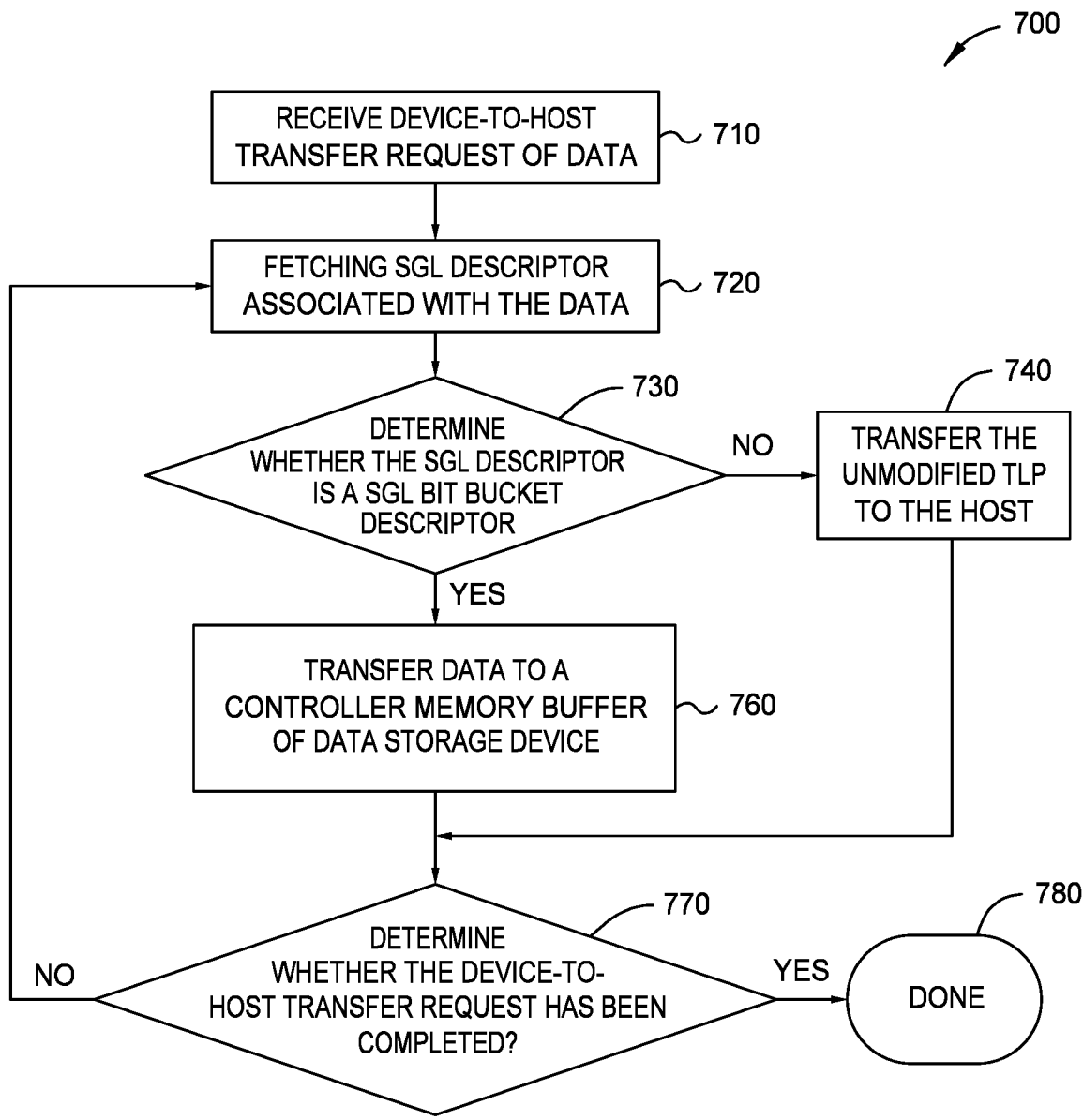
FIG. 7 is a schematic flowchart illustrating a process of a device-to-host transfer of data using one or more SGL bit bucket descriptors by transferring the data to a controller memory buffer of a data storage device controller.

FIG. 7 is a schematic flowchart illustrating a process 700 of a device-to-host transfer of data using one or more SGL bit bucket descriptors by transferring the data to a CMB 124 of the data storage device controller 110. The SGL of the device-to-host transfer of data can include one or more SGL bit bucket descriptors with or without any SGL data block descriptors. The process 700 is described in reference to the storage device controller 110 of the data storage device 102 of the computer system 100 of FIG. 1, but other storage device controllers are applicable.

At block 710 of process 700, the storage device controller 110 receives a device-to-host transfer request of data. For example, the device-to-host transfer request of data can be a NVMe read command of NVM 106 specifying a SGL for the data transfer in which the SGL has one or more SGL bit bucket descriptors. The NVMe read command can be fetched form a SQ stored in host memory 160 or from a SQ stored in CMB 124 of storage device controller 110.

At block 720, the storage device controller 110 processes the device-to-host transfer request by fetching a SGL descriptor associated with the requested data. For example, the storage device controller 110 activates the control path 142 to fetch the SGL descriptor associated with the requested data. The SGL can be stored in host memory 160 or in a CMB 124 of the storage device controller 110. A SGL descriptor associated with the requested data can either be a SGL data block descriptor or a SGL bit bucket descriptor from an appropriate SGL segments (e.g. SGL Segment 0, SGL Segment 1, SGL Segment 2 . . . last memory location of the SGL). For example, a SGL can comprise a first SGL entry pointing to the next SGL segment, which in turn can point to the next SGL segment, etc., until the last memory location of the SGL.

At block 730, the storage device controller 110 determines whether the SGL descriptor fetched at block 720 is a SGL bit bucket descriptor or a SGL data block descriptor. For example, the bit bucket manager 140 determines whether the SGL descriptor is or is not a SGL bit bucket descriptor.

Process 700 proceeds to block 740 from block 730 if the SGL descriptor is a SGL data block descriptor (e.g., is not a SGL bit bucket descriptor). At block 740, the storage device controller transfers to the host 150 one or more unmodified TLPs of the requested data associated with the SGL data block descriptor from block 730. The TLPs associated with a SGL data block descriptor are unmodified. The term "unmodified" as used herein means that the TLP does not contain any indication to the host 150 for the host to ignore the data payload of the TLP. For example, the storage device controller 110 sends an unmodified memory write request TLP to host 150 via host interface 101. The unmodified memory write request TLP causes host 150 to write the requested data from data storage device 102 to a physical location in host memory as indicated by the SGL data block descriptor.

Process 700 proceeds to block 760 from block 730 if the SGL descriptor is a SGL bit bucket descriptor. At block 760, the storage device controller transfers the data to a CMB 124 of the data storage device controller 110.

At block 770, the storage device controller determines whether the transfer request received at block 710 has been completed. If the transfer request has not been completed, the process 700 proceeds back to block 720 to fetch the next SGL descriptor associated with the requested data. If the transfer request is completed, the process 700 of transferring data in a device-to-host transfer request is done.

In the process 700, for both SGL bit bucket descriptors and SGL data block descriptors, storage device controller 110 transfers the requested data either to the host 150 or a CMB 124 of the data storage device 102. Therefore, the internal data pipe of data from the data storage device 102 is congruent for SGL bit bucket descriptors and SGL data block descriptors since the requested data is not discarded but is delivered to either to the host 150 or to a CMB 124 of the data storage device 102. Instead of dropping the transactions associated with SGL bit bucket descriptors, storage device controller 110 in process 700 does transfer the requested data to a CMB 124 of the data storage device 102.

Figure 8:
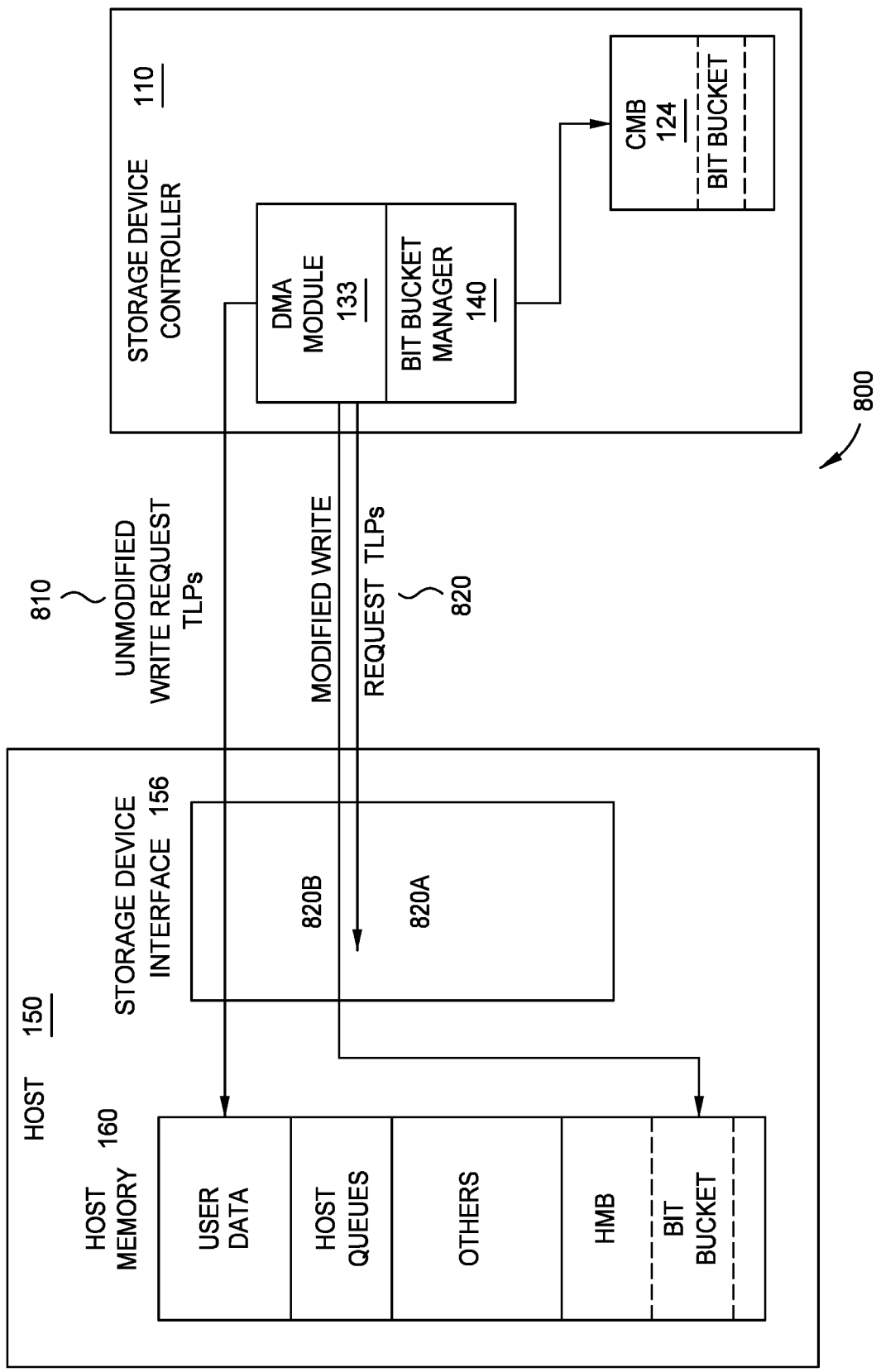
FIG. 8 is a schematic diagram of certain embodiments of a process of implementing a device-to-host transfer of data associated with a SGL bit bucket descriptor by a storage device controller.

FIG. 8 is a schematic diagram of certain embodiments of a process 800 of implementing a device-to-host transfer of data associated with a SGL bit bucket descriptor by a storage device controller 110. The process 800 is described in reference to the storage device controller 110 of the data storage device 102 of the computer system 100 of FIG. 1, but other storage device controllers are applicable. The bit bucket manager 140 detects whether a transfer is associated with a SGL bit bucket descriptor. If the transfer is not associated with a SGL bit bucket descriptor, the device DMA module 133 transfers one or more unmodified memory write request TLPs 810 of the data to a destination of a user data buffer in host memory 160 of the host 150.

In certain embodiments, if the transfer is associated with a SGL bit bucket descriptor, the DMA module 133 transfers modified memory write request TLPs 820 of the data to the host 150. The modified memory write request TLPs 820 include indications to the host 150 to ignore the data payload of the modified write request TLPs 820. The host sends completion TLPs in response to the modified write request TLPs 820. In one example, the modified memory write request TLPs 820 can be a TLP 820A indicating a byte enable of the transfer is zero. In another example, the modified write request TLPs 820 can be a poisoned TLP 820A. The modified write request TLPs 820A are transferred to a destination of the storage device interface 156 of host 150. In still another example, the modified memory write request TLPs 820 can be a TLP 820B to an address space in HMB 164 of host memory 160.

In certain embodiments, if the transfer is associated with a SGL bit bucket descriptor, the bit bucket manager 140 transfers the data to the CMB 124 of storage memory 122.

The processes 500, 700, and 800 of FIGS. 5, 7, and 8 can reduce the complexity of the implementation of the logic (i.e., in hardware and/or firmware) of both normal transfers and bit bucket transfers. In processes 500, 700, and 800, the requested data in response to a read command is delivered to a destination. In one example, the requested data can be delivered as modified TLPs and unmodified TLPs 810 to host 150. In another example, the requested data can be delivered either to the host 150 or to a CMB 124 of storage device controller 110. The complexity of the data pipe of the storage device controller 110 is reduced since the requested data is delivered to a destination instead of the data being discarded.

In one embodiment, a process of a device-to-host transfer of data using a SGL with one or more bit bucket transfers includes receiving a transfer command of the data. A SGL descriptor associated with the data is fetched. Whether the SGL descriptor is a SGL bit bucket descriptor or a SGL data block descriptor is determined. A modified TLP is generated when the SGL descriptor is determined to be a SGL bit bucket descriptor. The modified TLP includes an indication to the host to ignore a data payload of the modified TLP. The modified TLP is transferred to the host.

In one embodiment, a data storage device includes a host interface operable to interface with a host, a non-volatile memory, and a storage device controller. The storage device controller is operable to receive a transfer command of a data written to non-volatile memory. The transfer command uses a SGL and including one or more bit bucket transfers. The storage device controller is operable to fetch an SGL descriptor associated with the data. The storage device controller is operable to determine whether the SGL descriptor is a SGL bit bucket descriptor or a SGL data block descriptor. The storage device controller is operable to generate a modified TLP when the SGL descriptor is determined to be a SGL bit bucket descriptor. The modified TLP include an indication to the host to ignore a data payload of the modified TLP. The storage device controller is operable to transfer the modified TLP to the host.

In another embodiment, a data storage device include a host Peripheral Component Interface Express (PCIe) interface operable to interface with a device PCIe interface of a host. The data storage device further includes a non-volatile memory and a NVM Express (NVMe) storage device controller. The NVME storage device controller transfers a data from the device to the host involving one or more bit bucket transfers. The one or more bit bucket transfers are to a destination of a host memory buffer of the host, a controller memory buffer of the NVMe storage device controller, or the device PCIe interface of the host.

While the foregoing is directed to embodiments of the present disclosure, other and further embodiments of the disclosure may be devised without departing from the basic scope thereof, and the scope thereof is determined by the claims that follow.

What is claimed is:

1. A process of a device-to-host transfer of data, the process comprising:
receiving a transfer command of data programmed to non-volatile memory, wherein the transfer command comprises using a scatter gather list (SGL) and including one or more bit bucket transfers;
fetching a SGL descriptor associated with the data;
determining that the SGL descriptor is a SGL bit bucket descriptor;
generating a modified transaction layer packet (TLP) when the SGL descriptor is determined to be the SGL bit bucket descriptor, the modified TLP having an indication to a host to ignore a data payload of the modified TLP; and transferring the modified TLP to the host.

2. The process of claim 1, wherein the modified TLP indicates byte enables with cleared entries for a last byte enabled (BE) field and for a first BE field as the indication to the host to ignore the data payload of the modified TLP.

3. The process of claim 1, wherein the modified TLP comprises a set entry for an EP bit as the indication to the host to ignore the data payload of the modified TLP.

4. The process of claim 1, wherein the modified TLP comprises a replaced address to a host memory buffer of the host for an address field as the indication to the host to ignore the data payload of the modified TLP.

5. The process of claim 1, wherein the transfer command is a read command and wherein the modified TLP is a modified memory write request TLP.

6. The process of claim 5, wherein the read command is a NVM Express read command and wherein the modified memory write request TLP is a Peripheral Component Interface Express modified memory write request TLP.

7. A data storage device, comprising:
a host interface operable to interface with a host;
a non-volatile memory; and
a storage device controller, the storage device controller operable to:
receive a transfer command of a data written to non-volatile memory, the transfer command using a scatter gather list (SGL) and including one or more bit bucket transfers;
fetch an SGL descriptor associated with the data;
determine whether the SGL descriptor is a SGL bit bucket descriptor or a SGL data block descriptor;
generate a modified transaction layer packet (TLP) when the SGL descriptor is determined to be the SGL bit bucket descriptor, the modified TLP having an indication to the host to ignore a data payload of the modified TLP; and
transfer the modified TLP to the host.

8. The data storage device of claim 7, wherein the modified TLP indicates byte enables with cleared entries for a last byte enabled (BE) field and for a first BE field as the indication to the host to ignore the data payload of the modified TLP.

9. The data storage device of claim 7, wherein the modified TLP comprises a set entry for an EP bit as the indication to the host to ignore the data payload of the modified TLP.

10. The data storage device of claim 7, wherein the modified TLP comprises a replaced address to a host memory buffer of the host for an address field as the indication to the host to ignore the data payload of the modified TLP.

11. The data storage device of claim 7, wherein the storage device controller is further operable to transfer an unmodified TLP to the host when the SGL descriptor is determined to be the SGL data block descriptor.

12. The data storage device of claim 7, wherein the transfer command is a read command and wherein the modified TLP is a modified memory write request TLP.

13. The data storage device of claim 7, wherein the host interface is configured to operate under a Peripheral Component Interface Express (PCIe) interface protocol and wherein the data storage device is configured to communicate with the host under a NVM Express protocol over the PCIe interface protocol.

14. A data storage device, comprising:
a host Peripheral Component Interface Express (PCIe) interface operable to interface with a device PCIe interface of a host;
a non-volatile memory; and
a NVM Express (NVMe) storage device controller means for transferring a data in response to a device-to-host transfer request using a scatter gather list (SGL) and involving one or more bit bucket transfers to a destination selected from a group consisting of a host memory buffer of the host, a controller memory buffer of the NVMe storage device controller means, and the device PCIe interface of the host, wherein the data comprises a modified memory write request transaction layer packet (TLP), and wherein the modified memory write request TLP comprises an indication to the host to ignore a data payload of the modified memory write request TLP.

15. The data storage device of claim 14, wherein the NVMe storage device controller means is for transferring the data in response to the device-to-host transfer involving the one or more bit bucket transfers to the destination of the host memory buffer the host by transferring to the host the modified memory write request TLP with an replaced address to the host memory buffer for an address field.

16. The data storage device of claim 14, wherein the NVMe storage device controller means is for transferring the data in response to the device-to-host transfer involving the one or more bit bucket transfers to the destination of the controller memory buffer of the NVMe storage device controller means.

17. The data storage device of claim 14, wherein the NVMe storage device controller means is for transferring the data in response to the device-to-host transfer involving the one or more bit bucket transfers to the destination of the device PCIe interface of the host by transferring to the host the modified memory write request TLP with a zero-write byte enable.

18. The data storage device of claim 14, wherein the NVMe storage device controller means is for transferring the data in response to the device-to-host transfer involving the one or more bit bucket transfers to the destination of the device PCIe interface of the host by transferring to the host a poisoned memory write request TLP.

19. The data storage device of claim 14, wherein the NVMe storage device controller means is further for transferring the data in response to the device-to-host transfer involving one or more data block transfer by transferring to the host an unmodified memory write request TLP to a host memory of the host.

* * * * *